Jan. 17, 1961  R. A. WHITLOCK, JR  2,968,311
CONTROL SYSTEM FOR WATER TREATING APPARATUS
Filed Dec. 1, 1953  4 Sheets-Sheet 1

Inventor
Robert A. Whitlock, Jr.
By McCanna and Morsbach
Attys.

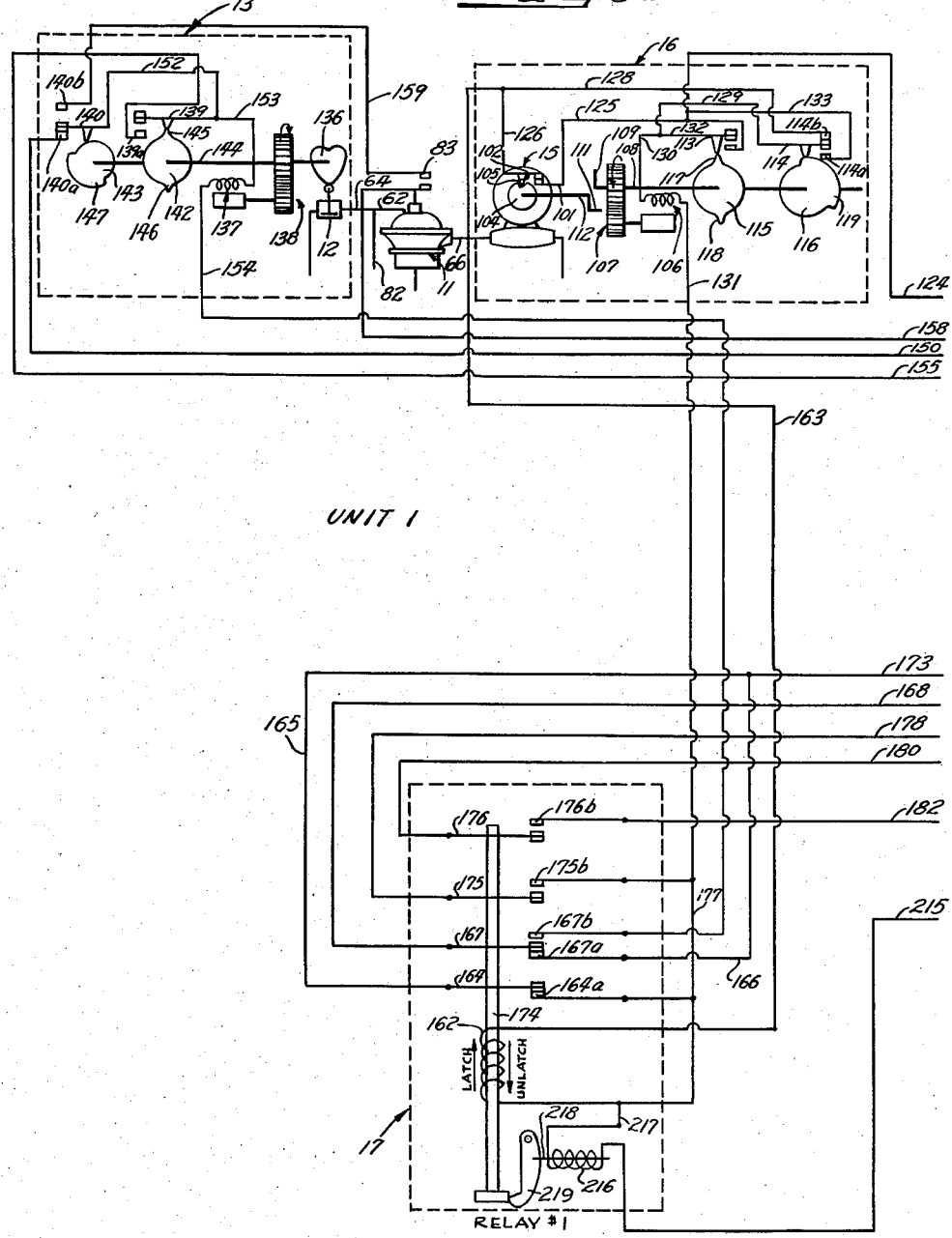

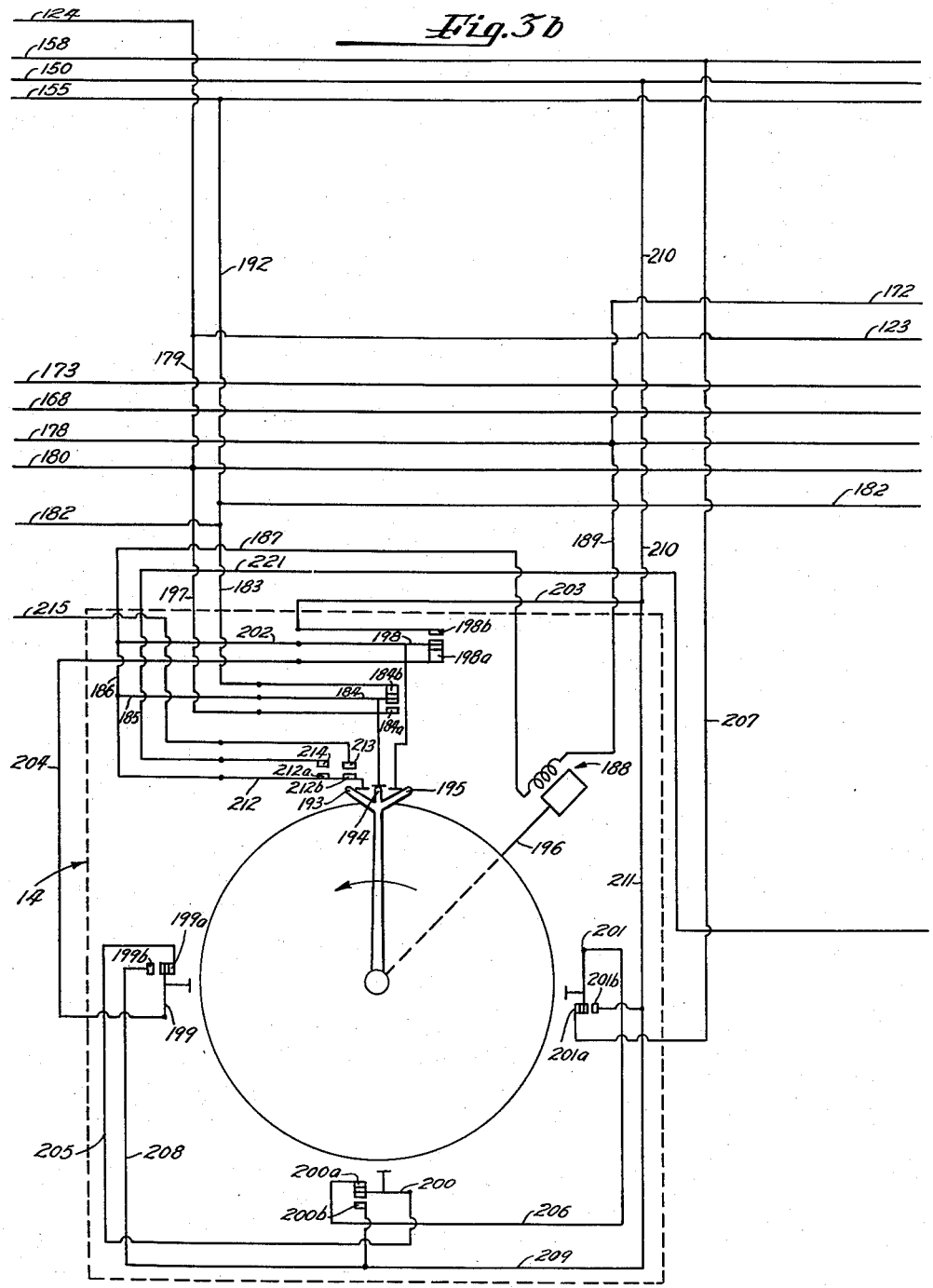

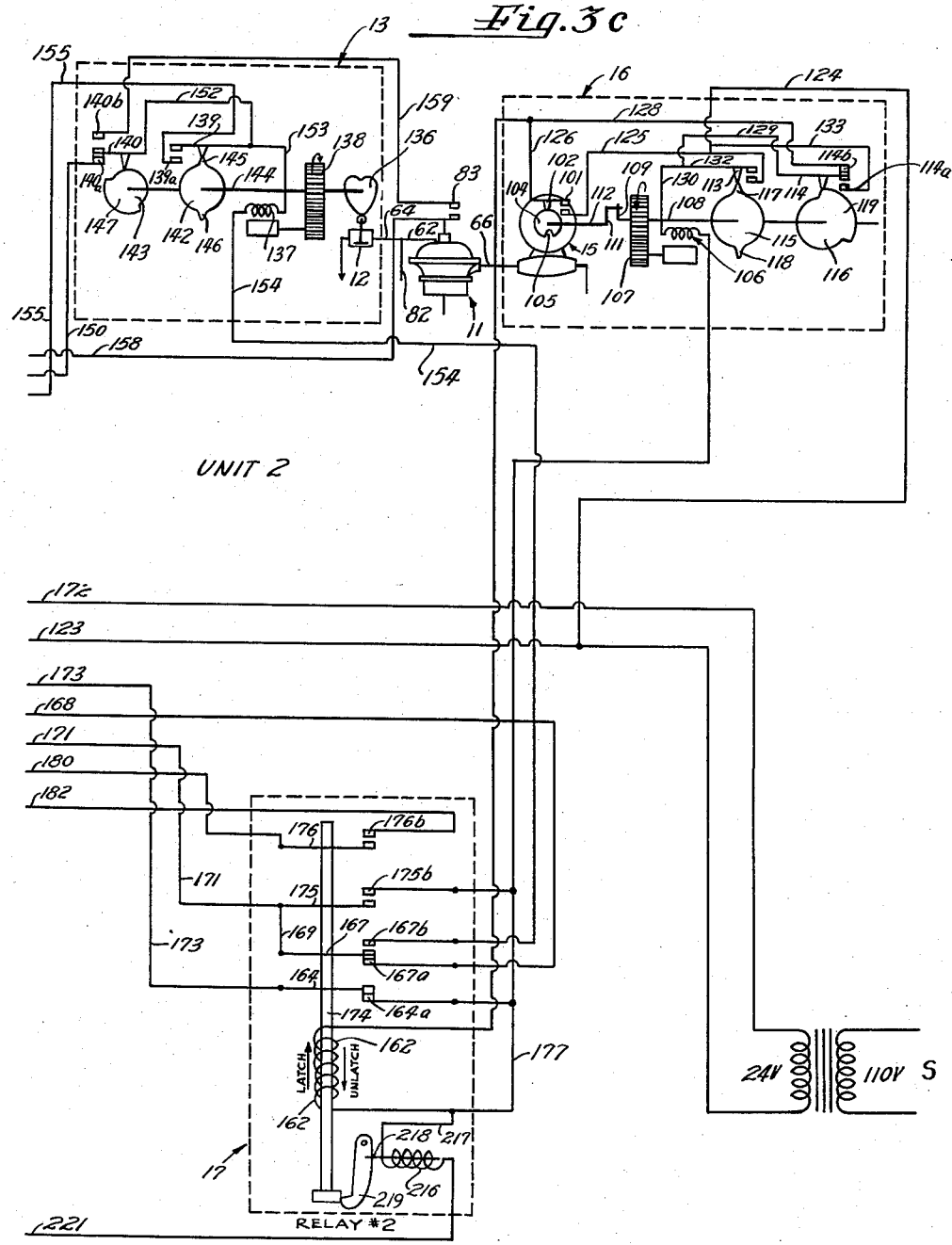

2,968,311

Patented Jan. 17, 1961

2,968,311

CONTROL SYSTEM FOR WATER TREATING APPARATUS

Robert A. Whitlock, Jr., Rockford, Ill., assignor to Aquamatic Inc., a corporation of Illinois Filed Dec. 1, 1953, Ser. No. 395,440

11 Claims. (Cl. 137—119)

The invention relates to a water treating apparatus and more particularly pertains to a control system for automatically controlling the various flows to and from the water treating unit during the successive phases of the regeneration cycle.

In general, the invention relates to water softening apparatus of the type employing a bed of exchange material such as zeolite. The exchange material becomes exhausted after a quantity of water has been passed therethrough and it is then necessary to regenerate the bed of material by subjecting it to a regeneration cycle of successive phases of backwashing, brining, rinsing and return to softening. The regeneration may be effected either manually or automatically. In a known type of automatic regeneration system, a multiport valve is driven by a motor to successive positions corresponding to the various phases of the regeneration cycle. In such a system it is necessary to control the duration of energization of the motor to insure that the multiport valve is in proper position for the next phase of the regeneration cycle when the motor is stopped. It is also necessary to control the periods between energizing the motor to provide the requisite time for each phase of the regeneration cycle. This necessitates a complex system of interconnected controls involving both time controls to control the intervals between energization of the motor and controls responsive to the position of the multiport valve to control movement of the valve to the various positions, which time and position responsive controls must be duplicated for each unit in a battery of water treating units.

In accordance with the present invention, the regeneration cycle is controlled by means of a rotary type multiport valve, which valve is rotated through one revolution to successive positions to control the various flows to and from the water treating apparatus in the regeneration cycle. The multiport valve is preferably of the hydraulically actuated type disclosed and claimed in the co-pending application of Dean R. Hull and Robert A. Whitlock, Jr., Serial No. 324,584, filed December 6, 1952, now Patent No. 2,870,788 in which the valve distributor is lifted, rotated and reseated on the ported valve face by means of an hydraulically controlled actuator, which actuator effects rotation of the multiport valve in response to lifting and reseating of the valve distributor on the valve face. The pressure applied to the actuator is under the control of a pilot valve, which pilot valve applies the requisite pressure changes to the multiport valve to effect movement of the valve distributor between successive positions, in response to opening and closing of the pilot valve.

In accordance with the present invention, the pilot valve is operated by a motor and a control circuit therefor which control circuit is adapted, upon the application of a short duration control signal thereto, to operate the motor and move the valve to its open position, at which time the control circuit de-energizes the motor until a succeeding signal is applied to the control circuit at which time the motor is operated to close the valve. Application of the control signals to the pilot valve motor control circuit is effected by means of timer controlled switches in which a timer operates the switches at variable intervals corresponding to the duration of the various phases of the regeneration cycle. In order to insure proper operation of the multiport valve, the signal applied by the timer to the pilot valve control circuit to effect closing of the pilot valve is under the control of a switch actuated by the multiport valve actuator when the latter is in its raised position, whereby closing of the pilot valve is effected only after the multiport valve has moved to one limiting position.

Provision is also made for operating a battery of water softener units in which the initiation of the regeneration cycle in each unit is independent of the other units, as by a meter which measures the water flow through the unit and which initiates the regeneration cycle after a predetermined number of gallons have passed therethrough. A single timer is utilized to control the regeneration cycle of all of the units. This is achieved through novel control circuits which initiate operation of the timer in response to the energization of the regeneration cycle in any one unit and simultaneously disable the pilot valve control circuits in all of the other units so that the regeneration cycle cannot begin in any of the other units until after the completion of the regeneration cycle in the first unit.

An important object of this invention is to provide an automatic control system for a water treating apparatus employing a multiport valve adapted to be stepped into various positions to control the various flows to and from the water treating apparatus during the regeneration cycle in which the duration of the various phases of the regeneration cycle are time controlled by a single timer.

Another object of this invention is to provide an automatic control system for a water treating apparatus in which the duration of the various phases of the regeneration cycle are time controlled, and in which the duration of each of the various phases may be easily varied.

Another object of this invention is to provide an automatic control system for a water treating apparatus employing a multiport valve which is adapted to be stepped into various positions to control the various flows of fluid to and from the water treating apparatus during the regeneration cycle, with a novel valve actuator and control circuit therefor whereby the stepping of the multiport valve from one position to the next is effected substantially independent of the duration of the timer controlled signal applied to the valve actuator control circuit.

Another object of this invention is to provide an automatic control system for a water treating apparatus employing a rotary multiport valve which is adapted to be stepped into various rotational positions to control the various flows to and from the water treating apparatus during the regeneration cycle, with a novel valve actuator and control circuit therefor whereby the multiport valve is stepped into each of the various positions solely in response to the timer controlled signals and independent of the rotational position of the multiport valve, which control system thereby obviates the necessity of utilizing means responsive to the rotational position of the multiport valve for controlling the actuator therefor.

A further object of this invention is to provide an automatic control circuit for a water treating apparatus employing an hydraulically actuated multiport valve which is stepped from one position to the next in response to the opening and closing of a pilot valve, which control circuit effects opening of the pilot valve at various periods during the regeneration cycle corresponding to the duration of the various phases of the regeneration cycle, and effects closing of the valve after each opening thereof only when the multiport valve is completely raised.

A further object of this invention is to provide an automatic control circuit for a battery of water treating units in which a single timer is adapted to control the regeneration cycle of the several water treating units in the battery.

Yet another object of this invention is to provide an automatic control circuit for a battery of water treating units in which means are provided for initiating the regeneration cycle in each unit independent of the other units, each of which units includes a multiport valve adapted to be stepped to various positions to control the flows of fluid to and from the water treating unit and a novel actuator means for the multiport valve whereby the latter may be stepped to the various positions in response to a timer controlled signal, which control circuit includes means responsive to the actuation of the regeneration cycle initiating means in any one unit to disable the valve actuating means in each of the other units whereby a single timer may be utilized to control the regeneration cycle of the several units.

Still another object of this invention is to provide an automatic control system for a battery of water treating units in which the regeneration cycle in each unit is initiated independent of the other units, which control system prevents regeneration of the other units when one unit is being regenerated and which enables regeneration of the other units after the completion of the regeneration cycle in the first unit to be regenerated, which system prevents subsequent regeneration of more than one unit at a time should two or more additional units in the battery become exhausted while one unit is being regenerated.

Other objects and many of the attendant advantages of this invention will be more readily appreciated as the same becomes better understood by reference to the following detailed description when considered in connection with the accompanying drawings wherein:

Figs. 3a, 3b and 3c are a schematic diagram of an automatic control system for a pair of water treating units.

Figure 1:
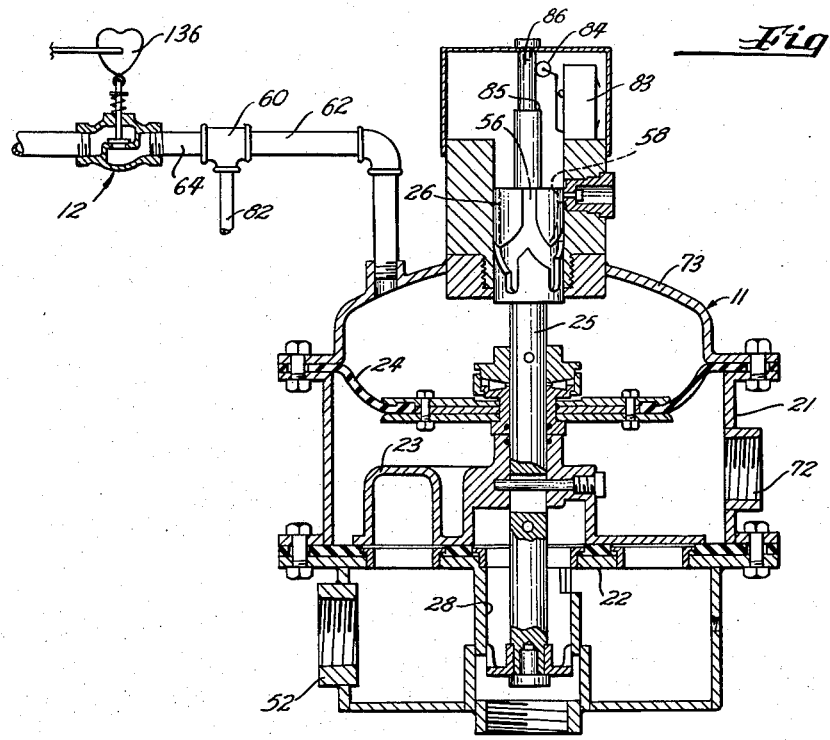
Figure 1 is a vertical sectional view of an hydraulically actuated multiport valve suitable for use with the control system of the present invention.

The water treating apparatus control system of the present invention is shown applied to a water softening apparatus, although not limited to that application, employing a tank 10 containing water treating material, and in which the various flows of fluid to and from the water softening tank during the successive phases of the backwashing, brining, rinsing and return to softening are controlled by means of a multiport valve 11. The multiport valve is preferably of the hydraulically actuated lift-turn type in which the valve distributor is lifted, turned and reseated on the ported valve body in response to manipulation of the pilot valve 12 which controls the application of fluid pressure to the multiport valve actuator. In accordance with the present invention, the pilot valve is motor operated and is provided with a novel control circuit 13 therefor which is responsive to a first timer controlled signal from the timer 14 to operate the pilot valve motor to close the pilot valve, and responsive to a second timer controlled signal to open the valve, which second signal is effective to open the pilot valve only after the multiport valve has been completely raised, thereby insuring that the multiport valve will be stepped to the next position.

Initiation of the regeneration cycle in each water softening unit may be effected by any means which at the desired point of exhaustion of the softening unit produces a regeneration cycle initiating signal. In the present invention, this means comprises a gallonage meter 15 which closes a switch after a predetermined gallonage has passed therethrough. Provision is made in the present invention for automatically resetting the meter by means of a meter reset control apparatus 16 after the regeneration cycle has been initiated in the unit, whereby the meter is automatically readied for a succeeding service run.

It is advantageous in certain installations to provide a plurality of water treating units, some of which may have different demands as regards quality or quantity of water produced thereby and which units may have different capacities. The apparatus of the present invention permits control of the initiation of the regeneration cycle in each unit independent of the other units as by the provision of a gallonage meter which measures the flow through each unit. However, it is generally undesirable to have more than one unit undergo regeneration at any one time since this considerably reduces the output of the battery of units and consequently an interlocking control 17 is provided for each unit to prevent the initiation of the regeneration cycle in a second unit after the regeneration cycle initiating means of the first unit has been actuated.

Figure 2:
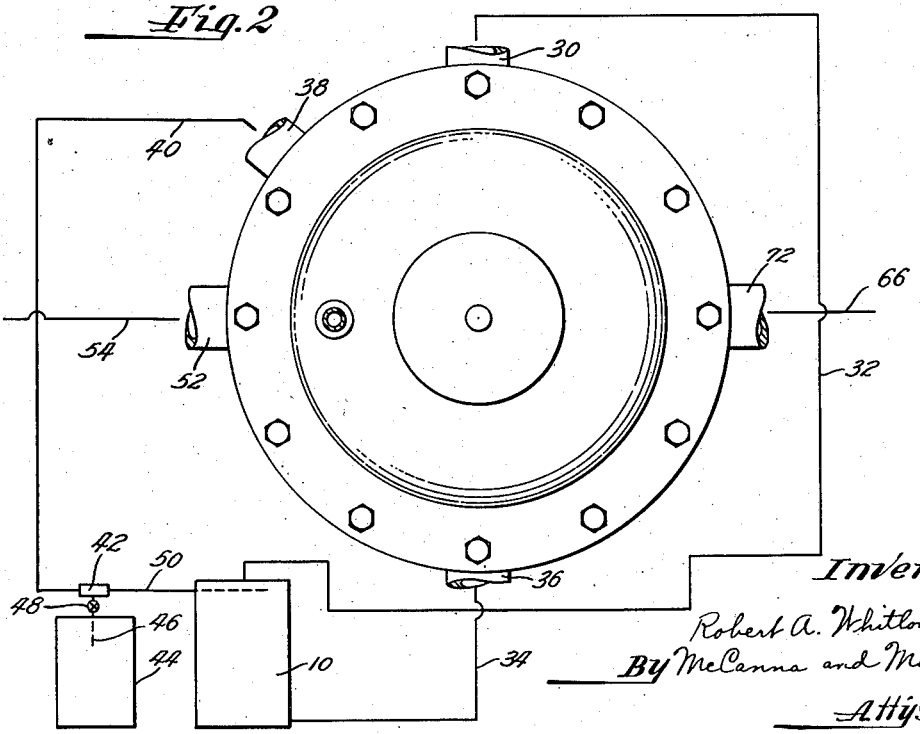
Fig. 2 is a top plan view of the multiport valve illustrating the connections between the various passages in the valve and the water softening apparatus.

The multiport valve 11 (Figs. 1 and 2), which in the broader aspects of the invention may be of any of a number of known valve constructions, in the present embodiment comprises a valve body 21 having a ported valve face 22 and a distributor 23 for controlling the flows of fluid through the ported valve face 22. The distributor 23 is adapted to be lifted, turned and reseated on the valve face by a pressure responsive mechanism including the diaphragm 24, the valve stem 25, and the cam 26 carried by the valve stem for turning the latter as the valve stem is reciprocated by the pressure responsive diaphragm 24. As is apparent from Fig. 1, the cam 26 is provided with a cam groove 56 which is so shaped that the cam follower 58 riding therein causes the cam member and valve stem to rotate through a predetermined angle as the valve stem and cam member is raised, the cam member rotating through a further angle as the valve stem is lowered to reseat the distributor 23 on the valve face 22. The valve casing 21 is provided with a hard water inlet passage 72 above the distributor and a centrally disposed drain passage 28.

A passage 30 in the casing communicates through pipe line 32 with the top of the softening tank 10, the bottom of which tank communicates through pipe line 34 with the passage 36. A further passage 38 communicates through pipe line 40 with an injector 42 associated with the brine tank 44, and which is adapted to withdraw brine from the brine tank through pipe 46 and valve 48 and introduce the water and brine into the top of the softening tank 10 through pipe line 50. During the normal service run, soft water flows out through passage 52 and pipe line 54.

The distributor 23 is provided with various passages and ports therein adapted to register with the several ports in the valve face 22 in different rotational settings of the distributor to establish the necessary flows to and from the water softening apparatus during the various phases of the regeneration cycle including backwashing, brining, rinsing and return to service, the valve distributor 23 being lifted, turned in response to lifting, and lowered on the valve face 22, under the control of the fluid pressure in the chamber between the valve bonnet 73 and the diaphragm 24. The fluid pressure in this chamber is, in turn, controlled by the pilot valve 12 which regulates the application of water pressure from the water inlet line 82. The pressure applied to the chamber between the diaphragm 24 and the bonnet 73, under static conditions is preferably equal to the pressure applied to the underside of the diaphragm and accordingly one end of the water inlet line 82 is connected to the raw water supply line 66 which is also connected to the port 72 in the valve body 21. The other end of the water inlet line 82 is connected to a T-fitting 60, which fitting connects the inlet line to pipe line 62 and to drain pipe 64. The normally closed pilot valve 12 prevents the flow of water through the drain line during the normal service run and consequently the pressure of the raw water inlet line is applied through pipes 82 and 62 to the upper side of the diaphragm 24 thereby retaining the distributor 23 seated on the valve face 22. The water inlet line 82 is of small cross-section so that when the pilot valve 12 is opened in the relatively larger drain pipe 64, the water pressure on the upper side of the diaphragm is reduced thereby effecting lifting of the distributor from the valve face. The small pipe line 82 functions as an hydraulic impedance and thereby prevents the application of the full pressure of the raw water inlet line to the upper face of the diaphragm when water flows through line 82. However, when the drain valve is again closed, the static pressure on the upper face of the diaphragm again equals the raw water inlet line pressure and weight of the distributor causes the latter to be reseated on the valve face. Obviously, other types of pilot valves and arrangements therefor may be utilized without departing from the scope of the present invention. Thus, a two-way pilot valve may be employed to alternately apply fluid pressure to the chamber between the bonnet 73 and the diaphragm 24, and then connect this chamber to drain.

For reasons which will readily become apparent as the following description proceeds, a switch 83 is provided on the multiport valve 11 and is adapted to be closed in response to lifting of the cam 26 to its uppermost position. For this purpose there is provided a follower 84 on the switch which is adapted to engage the shoulder 85 on the valve stem extension 86 when the valve stem is moved into its uppermost position.

The automatic control system illustrated in Figs. 3a, 3b and 3c is adapted to control a battery of two or more water softening units, each of which units includes a multiport valve 11 adapted to be stepped into various rotational positions to control the flows of fluid to and from the water treating apparatus during the regeneration cycle; a pilot valve 12 and a control circuit 13 therefor for controlling the application of fluid pressure to the hydraulic actuator of the multiport valve; a gallonage meter 15 for measuring the quantity of fluid flowing through the water softening unit and for producing a regeneration cycle initiating signal after a predetermined gallonage has flowed through the meter; and an interlock control 17, which interlock controls of the several units are interconnected in a manner more fully set forth hereinafter to prevent regeneration in more than one unit at a time. The automatic control system of the present invention is advantageously arranged so that a common timer 14 is adapted to control the regeneration cycles in each of the several units.

Since the corresponding elements of the several units are the same, only one unit will be described in detail, it being understood that the description is applicable to each of the units in the battery as shown in the drawings, the pilot valves 12, the pilot valve control circuits 13 and the meter reset control apparatus are in the positions assumed during the normal service run. For purposes of description, it is assumed that unit No. 1 has just become exhausted, as determined by the gallonage meter 15 and unit No. 2 has just been regenerated. For convenience, like numerals are utilized to designate corresponding parts in the several units.

The regeneration cycle in each of the several units of the battery, designated units 1 and 2 in the drawings, is initiated independent of the other units by means of a switch 101, which switch is retained open during the service run by the cam 104 on the gallonage meter 15 and which is adapted to be closed after a predetermined gallonage has flowed through the meter 15, at which time the cam follower 102 on the switch 101 drops into the well portion 105 on the cam 104. The meter reset control circuit 16, which is provided to reset the cam 104 after the initiation of the regeneration cycle, comprises a meter reset motor 106 which is adapted, upon energization thereof to drive the shaft 108 through a gear train 107. The shaft 108 has an arm 109 thereon adapted to engage the crank 111 on the meter shaft 112. The motor 106 is energized from a source of power through switches 113 and 114 controlled by cams 115 and 116 on the shaft 108, cam 115 being provided with relatively sharp lobes 117 and 118 angularly spaced 180° from each other, and cam 116 being provided with a lobe 119.

At the beginning of the service run, the well portion 105 of the meter cam 104 was angularly advanced relative to the cam follower 102 on switch 101, and the crank 111 which is coupled to the cam 104 by the shaft 112 was also angularly advanced to a position such as shown for the reset meter control circuit for unit No. 2 in Fig. 3c. Under these conditions, the arm 109 on the shaft is positioned so as to contact the crank 111 on the side thereof opposite the direction of rotation of the meter shaft 112, and the cams 115 and 116 are positioned so as to respectively open switch 113 and move switch 114 out of engagement with contact 114a and into engagement with contact 114b. After the predetermined gallonage has flowed through the water softener unit the cam 104 is rotated to a position such that the follower on switch 101 drops into the cam well 105 whereby the meter switch 101 is closed. This is the position of the meter controlled switch 101 in unit No. 1. Power is then applied through conductors 126 and 128, contact 114b of switch 114, conductors 129 and 130 to the motor 106, the other side of which is connected through a conductor 131 to ground in a manner more fully described hereinafter. Closing of the meter switch thus energizes the reset motor 106 causing the shaft 108 to turn which then permits switch 113 to close, and permits switch 114 to move out of engagement with contact 114b and into engagement with contact 114a. Power is then applied to the reset motor through conductors 123 and 124, switch 113 and conductor 132 to the motor 106 and also through conductor 133, contact 114a of switch 114, conductor 129 to the motor 106. This last-mentioned circuit to the motor is maintained for about three-fourths of a revolution of the shaft 108, at which time cam 116 moves switch armature 114 out of engagement with contact 114a and into engagement with contact 114b. Power is continued to the motor through switch 113, conductor 132 and conductor 130 until the cam lobe 117 again opens the switch 113 thereby stopping the meter reset motor 106. Thus, the shaft 108 is caused to rotate through one complete revolution, during which revolution it contacts the crank 111 at an angular position of the shaft 108 dependent upon the angle of advance of the cam 104, the shaft 108 thereafter moving the shaft 112 through the remainder of the revolution of the shaft 108 to reset the cam 104.

The pilot valve 12 in each of these several water softening units of the battery is advantageously moved to its open and closed positions by means of a cam 136 which is driven by a motor 137 through a gear train 138. The cam is so shaped as to cause the valve to be moved from its closed position to its open position and back to its closed position, in response to rotation of the cam through one revolution. Energization of the pilot valve operating motor 137 is controlled by cam operated switches 139 and 140, which switches are respectively actuated by cams 142 and 143. Cams 142 and 143 are driven in unison with the valve operating cam 136 through the shaft 144, and cam 142 is provided with relatively sharp lobes 145 and 146, angularly spaced 180° from each other, while cam 143 is provided with a lobe 147. With the pilot valve 12 in its normally closed position shown in the drawings, the cams 142 and 143 are arranged on the shaft 144 so that the cam lobe 145 urges the switch 139 to its open position and cam 143 causes the switch 140 to move out of engagement with the contact 140b and into engagement with the contact 140a thereof. When a timer controlled signal is applied through conductor 150, in a manner more fully described hereinafter, through switch contact 140a, switch 140, conductors 152 and 153 to the pilot valve motor 137, which motor is otherwise connected to ground through conductor 154, the motor is started and the shaft 144 caused to rotate. Pilot valve motor sustaining power is also applied, in a manner to be described more fully hereinafter, through conductor 155, switch 139, and conductor 153 to the motor 137 after the shaft 144 is rotated to a position such that cam lobe 145 moves out of engagement with the follower on switch 139, whereupon the switch 139 is closed. The motor drives shaft 144 and cam 143 therewith to thereby move the switch 140 out of engagement with contact 140a and into engagement with contact 140b, the motor remaining energized until the cam 142 has been driven through one-half revolution at which time the lobe 146 thereof engages the switch 139, opening the latter and stopping the motor. While the motor was driving the cam 142 through 180°, the cam 136 is moved therewith to open the pilot valve 12 thereby permitting the fluid pressure in the chamber between the diaphragm 24 and the bonnet 73 to be discharged through the drain line 64 causing the distributor 23 to be lifted and turned through 45°. Upon the completion of the upstroke of the stem 25 the follower 84 of the switch 83 engages the shoulder 85 on the stem extension 86, closing the switch 83. In a manner also to be more fully described hereinafter, a timer controlled signal is applied through conductor 158, switch 83, conductor 159, and contact 140b of switch 140 to the pilot valve motor. Since the motor was stopped with the switch 140 in engagement with the contact 140b, it is apparent that power is applied to the pilot valve motor 137 whenever the switch 83 is closed. This causes the motor to start, at which time the lobe 146 of the cam 142 moves out of engagement with the cam follower and closes the switch 139 thereby sustaining motor operation for another half revolution of the cam 142 until the lobe 145 again opens the switch 139. In this manner the pilot valve is positively operated to its open position in response to a timer controlled signal, and substantially independent of the duration of that signal, the pilot valve being moved back to its closed position in response to a succeeding timer controlled signal which is applied only when the multiport valve has moved to its upper limiting position, whereby closing of the pilot valve is effected only after the multiport valve has completely raised. Since the multiport valve is rotated between successive positions only in response to movement of the valve stem between its limiting positions, it is apparent that this circuit construction prevents operation of the pilot valve without a corresponding actuation of the multiport valve.

Closing of the gallonage meter switch 101 in any one unit also effects energization of the latching relay coil 162 of the interlock control circuit 17 of that unit. For purposes of description, it is assumed that the meter switch of unit No. 1 is closed, as shown in Fig. 3a. Power is then applied through the switch 101 and conductor 163 to the latching relay coil 162, which coil is otherwise connected to ground, when in the unlatched position, through contact 164a of switch 164 of unit No. 1, through conductors 165 and 166, contact 167a of switch 167 of unit No. 1, conductor 168, contact 167a and switch 167 of the latching relay of unit No. 2, conductors 169, 171 and 172. The latching relay 162 of interlock control 17 of unit No. 2 is similarly grounded through the switches controlled by latching relay No. 1. More specifically, the latching relay coil 162 of unit No. 2 is connected through switch contact 164a and switch 164 of unit No. 2, conductors 173 and 166, contact 167a and switch 167 of interlock control 17 of unit No. 1, conductor 168, contact 167a and switch 167 of interlock control circuit of Unit No. 2, to ground through conductors 169, 171 and 172. Thus, when both of the interlock controls of relays 1 and 2 are in the unlatched position, the latching relay coils 162 thereof are connected to ground through the relay controlled contacts of the other latching relay. Upon energization of the latching relay coil 162 of either of the units, the armature 174 controlled thereby causes switches 164 and 167 to move out of engagement with contacts 164a and 167a respectively thereof and causes the switch 167 to move into engagement with contacts 167b. This disconnects the ground circuit of the other latching relay coils, and prevents energization thereof in response to closing of the associated meter controlled switch 101. Movement of the armature 174 of the latching relays into their latched position also effects closing of switches 175 and 176. Closing of the switch 175 in one interlock control unit also re-establishes the ground circuit for the latching relay coil 162 of that unit, the circuit being completed through conductor 177, contact 175b of switch 175, conductor 178 and conductor 172 to ground.

The reset meter motors 106 in each unit are connected to ground through the ground circuit provided for the latching relay of that unit. Thus, when the latching relays in each of the several units are in their unlatched position, the reset meter motor in one unit may be energized in response to closing of the meter switch in that unit. However, when the latching relay in any one unit is in its latched position, the ground circuits for the latching relays and pilot valve motors of the other units are interrupted, thereby preventing operation thereof.

Closing of switch 176, in either of the interlock control units effects the application of power from the source through conductor 123, conductors 179 and 180, switch 176 and contact 176b thereof, conductors 182 and 183 to contact 184b of timer controlled switch 184 and through conductors 185, 186 and 187 to the timer motor 188, which motor is otherwise connected to ground through conductors 189 and 172. Power is also applied in response to closing of switch 176 to contact switch 139a of the pilot valve control circuit 13 through conductors 182, 192 and 155. The pilot valve motors 137 are connected to ground through conductors 154 and contact 167b of switch 167 of the associated latching relay. Thus, circuit is completed to ground at each of the pilot valve motors 137, only when the associated latching relay is in its latched position, and since the relays are energized into their latching position in response to closing of the gallonage switch 101 in the associated water softening unit, it is apparent that energization of the pilot valve motor in any one unit can be effected only in respone to closing of the gallonage meter switch of that unit. Further, since actuation of one latching relay into its latched position prevents energization of the other latching relays in the battery of units, it is apparent that the pilot valve motor in only one unit can be in operation at any one time. This permits the use of a single timer control 14 to control the regeneration cycles in the several units of the battery.

The timer control unit may conveniently be of the type disclosed in the copending application of Robert A. Whitlock, Jr. for an Electrical Timer, Serial No. 347,446, filed April 8, 1953, now Patent No. 2,742,540, and comprising three switch actuating cams 193, 194 and 195 which are driven by the timer motor 188 through the shaft 196 at a speed such that the cams complete one revolution in a time interval corresponding to the duration of the normal regeneration cycle, which time interval may be of the order of ninety minutes. Cam 194 controls the operation of switch 184 and during the service run, at which time the motor 188 is stopped, is in the position shown in the drawings with switch 184 moved out of engagement with contact 184a and into engagement with contact 184b. Upon closing of the gallonage meter switch, in any one of the several units and energization of the latching relay of that unit, power is applied through switch 176 and contact 176b of the latching relay of that unit and through conductors 182 and 183, contact 184b and switch 184, conductors 185, 186 and 187 to the timer motor 188, thereby starting the same. After a short time, cam 194 moves out of engagement with the cam follower therefor and allows switch 184 to move into engagement with contact 184a thereby applying sustaining power directly from the source, through conductors 123, 179 and 197, contact 184a and switch 184, conductors 185, 186 and 187 to the motor 188 thereby continuing the power circuit to the motor, for the remainder of the regeneration cycle. A short interval of time after the motor 188 has begun to operate, cam 195 moves into engagement with the cam follower therefor and moves switch 198 into contact with switch 198b. Movement of the switch 198 into engagement with contact 198b applies power from the source through conductors 123, 179, 197, contact 184a and switch 184, conductors 185, 186 and 202 through switch 198 and contact 198b thereof, conductors 203, 210 and 150 to the contacts 140a in the several pilot valve control circuits. Since the switches 140 in each of the pilot valve control circuits engage contacts 140a, power is then applied through conductors 152 and 153 to the pilot valve motors 137, which motors are then energized, provided the ground circuit therefor is completed through the associated latching relay in the manner hereinbefore set forth. Upon energization of one of the pilot valve motors, the associated pilot valve is operated from its normal closed position to its open position which in turn causes the associated multiport valve to be moved to its lifted position. Continued movement of the cam 195 causes the latter to pass out of engagement with the follower thereof, thereby moving switch 198 out of engagement with contact 198b and into engagement with contact 198a. This applies power, in a manner to be more fully described hereinafter, to the multiport valve control switch 83 in each of the several water softening units, which last-mentioned switch, upon closure thereof in response to lifting of the multiport valve, operates the pilot valve motor to effect closing of the pilot valve.

Since the duration of the cyclic of the pilot valve control circuit is short as compared to the duration of the cycle of the timer, it is apparent that the signal applied by the timer to the pilot valve control circuits need only be of short duration sufficient to permit cam 142 to pass out of engagement with switch 139 and close the pilot valve motor sustaining circuit. On the other hand, should the signal applied by the timer to the pilot valve control circuit to close or open the pilot valve be of relatively long duration, it will not adversely affect the operation of the pilot valve.

A plurality of switches 199, 200 and 201, each similar to the switch 198 are positioned in the path of movement of the cam 195 at angularly spaced positions whereby the switches 199, 200 and 201 are successively actuated by the cam 195 at intervals respectively corresponding to the duration of the backwashing, brining and rinsing phases of the regeneration cycle. Switches 198, 199, 200 and 201 are normally in engagement with contacts 198a, 199a, 200a and 201a, respectively. Upon movement of switch 198 into engagement with contact 198a thereof, after the cam 195 has passed out of engagement with the cam follower therefor, power is applied through switch 198, contact 198a, conductor 204, switch 199 and contact 199a thereof, conductor 205, switch 200 and contact 200a thereof, conductor 206, switch 201 and contact 201a thereof to conductor 207, which conductor is connected through conductors 158 to the multiport valve actuator switches 83 in the several units of the battery. As the cam 195 moves through one revolution it engages switch 199 moving the latter out of engagement with contact 199a and into engagement with contact 199b thereby interrupting the power to the pilot valve motor closing circuit and momentarily applying power to the pilot valve motor opening circuit through contact 199b, conductors 208, 209, 211, 210 and conductors 150 to the contacts 140a of the pilot valve control circuits. Similarly the cam 195 moves into engagement with the switches 200 and 201 to momentarily interrupt the power to the pilot valve closing circuit and simultaneously apply power to the pilot valve opening circuit to again step the multiport valve into its next succeeding position. Just before the cams 193, 194 and 195 complete one revolution, cam 193 engages switch 212 having dual contacts 212a and 212b, moving the contacts into engagement with contacts 213 and 214 and thereby simultaneously applying power to the circuits connected thereto. Contact 213 is connected through conductor 215 to the latch release coil 216 of the interlock control circuit of unit No. 1, which latch release coil is grounded through conductors 217 and 177, and through contact 175b of switch 175 in relay No. 1, when the relay is in its latched position, thereby actuating the armature 218 to retract the latch 219, and permit the relay to move to its unlatched position. Simultaneously, contact 214 is connected by conductor 221 to the latch release coil 216 in the interlock control circuit of unit No. 2, which latch release coil is grounded through conductors 217 and 177 and through contact 175b of switch 175 in relay No. 2 whereby the latch release relay in energized only when the associated relay is in its latched position.

Further movement of the cams 193, 194 and 195 causes cam 193 to pass out of engagement with switch 212, thereby opening the circuit to the latch release relays, continued movement causing cam 194 to engage the follower therefor and move switch 184 out of engagement with contact 184a and into engagement with contact 184b, thereby interrupting the application of power to the timer motor 188 and stopping the latter. Cam 195 is therefore stopped at the end of the regeneration cycle just before engaging the follower on switch 198.

From the foregoing it is thought that the operation of the automatic control system will be readily understood. For convenience, the following discussion of the operation of the system will be based on the assumption that the meter switch 101 of unit No. 1 is first actuated, and thereafter during the regeneration cycle of Unit No. 1, the meter switch of unit No. 2, or of any other unit in the battery of units is actuated.

During the service run, fluid from the hard water inlet line enters through passage 72, through registering ports in the distributor 23 and the valve face 22, and passes through passage 30 and pipe lines 32 to the top of the water softening tank 10, the soft water from the bottom of the tank 10 passing through pipe line 34, passage 36 in the multiport valve 11 and out through passage 52 to the soft water outlet line 54. Upon closing of the switch 101 power is applied from the source S through conductors 123, 124, 125, switch 101, conductor 163 to the latching coil 162 of unit No. 1 which coil is otherwise connected to ground through contact 164a of switch 164, conductors 165 and 166, contact 167a of switch 167, conductor 168, contact 167a of switch 167 in the interlock control 17 of unit No. 2, conductors 169, 171 and 172. This energizes the latching relay of unit No. 1 causing the latter to move into its latched position thereby breaking the ground connection therefor through switches 164 and 167 and establishing a new ground connection through conductor 177, contact 175b of switch 175 and conductors 178 and 172. Movement of the latching relay of unit No. 1 into its latched position disconnects the ground circuit for the latching relay coil of unit No. 2 and also disconnects the ground circuit for the reset motor thereof, and prevents operation of the latching relay and reset motor of unit No. 2 should the gallonage meter switch of the second unit become closed while the latching relay of unit No. 1 is in its latched position.

Closing of the gallonage meter switch 101 of unit No. 1 also applies power through conductors 126 and 128 to contact 114b of switch 114 through conductors 129 and 130 to the reset meter motor 106 which motor is connected to ground through conductor 131, contact 175b of switch 175 and conductors 178 and 172, when the latching relay of unit No. 1 is in its latched position. This starts the reset meter motor whereupon switches 113 and 114 are actuated to continue operation of the reset meter motor for one complete revolution of the shaft 108 thereby resetting the cam 104 on the gallonage meter.

More specifically, the cams 115 and 116 are driven by the shaft 108 in response to the motor 106 from the position shown in the drawings wherein the cam 117 opens switch 113 and cam 116 moves switch 114 into engagement with contact 114b thereof, to a position such that switch 113 is closed and remains closed for one-half revolution of the shaft 108 and switch 114 is moved out of engagement with contact 114b and into engagement with contact 114a for approximately three-fourths of a revolution. Power is therefore supplied to the reset meter motor 106 through conductors 123, 124, contact 114a of switch 114, conductors 129 and 130. After approximately three-fourths of a revolution of the shaft 108 switch 114 is moved out of engagement with contact 114a and into engagement with contact 114b thereby interrupting power to the reset meter motor through that switch. However, power is continued to the reset meter motor 106 through the switch 113 for the remainder of the revolution of the shaft 108, at which time the cam lobe 117 engages the follower on the switch 113, opening the latter and stopping the motor 106. As the shaft 108 is rotated through one revolution, the arm 109 thereon moves until it contacts the crank 111 whereupon further rotation of the shaft 108 causes the shaft 112 and the cam 104 carried thereby to rotate therewith for the remainder of the revolution of the shaft 108. This causes the cam 104 to open the switch 101 and also angularly advances the well 105 to a position such that closing of the gallonage meter switch 101 is again effected after an additional predetermined number of gallons has flowed through the meter 15.

Movement of the latching relay of unit No. 1 into its latched position breaks the ground circuit therefor through contact 164a of switch 164, and re-establishes the ground circuit therefor through conductor 177, contact 175b of switch 175, conductors 178 and 172. Further, since movement of the latching relay of unit No. 1 moves switch 164 out of engagement with contact 164a it is apparent that the ground circuit for latching relay of unit No. 2 is interrupted, as is the ground circuit for the reset meter motor 106 of unit No. 2. With the latching relay of unit No. 1 in its latched position, power is applied through conductors 123, 179 and 180 to switch 176 and contact 176b thereof, conductors 182, 192 and 155 to the contact 139a of switch 139 in the pilot valve control circuit. Thus, power is applied to the sustaining circuit of the pilot valve motor only when the associated latching relay is in its latched position, thereby preventing accidental energization of the pilot valve motor. Power is also applied in response to movement of the switch 176 into engagement with contact 176b through conductors 182 and 183, contact 184b of timer controlled switch 184, conductors 185, 186 and 187 to the timer motor 188, which motor is otherwise connected to ground through conductors 189 and 172. In this manner the timer motor 188 is started only after one of the latching relays in the several units of the battery has been energized to its latched position.

At the beginning of each regeneration cycle the timer controlled cams 193, 194 and 195 are in the position shown in Fig. 3b of the drawings with cam 194 engaging the cam follower on switch 184 and moving the latter into engagement with contact 184b thereof, and cam 195 out of engagement with the cam follower on switch 198 whereby the latter engages contact 198a. Upon energization of the timer motor 188, the cams 193, 194 and 195 are caused to rotate in a counterclockwise direction as viewed in Fig. 3b and after a short time interval, cam 194 moves out of engagement with the cam follower on switch 184 thereby moving the switch out of engagement with contact 184b and into engagement with contact 184a. This supplies sustaining power to the timer motor through conductors 123, 179 and 197, contact 184a of switch 184, and conductors 185, 186 and 187. The timer motor 188 remains energized until the cam 194 completes one revolution at which time the switch 184 is moved out of engagement with the contact 184a to interrupt the power to the motor. A short interval of time after the timer motor is energized, the cam 195 engages the follower on switch 198 moving the latter into engagement with contact 198b. Power is then applied through conductors 123, 179, 197, contact 184a of switch 184, conductors 185, 186 and 202 to the switch 198 and contact 198b thereof, conductors 203, 210 and 150 to contact 140a of switch 140 of the pilot valve control circuit 13, through conductors 152 and 153 to the pilot valve motor 137, which pilot valve motor is otherwise connected to ground through conductor 154, contact 167b of switch 167 in the interlock control circuit 17 of unit No. 1 through conductor 168, contact 167a and switch 167 of interlock control circuit of unit No. 2, and conductors 169, 171 and 172. This energizes the pilot valve motor 137 which drives the shaft 144. After a short time, lobe 145 on the cam 142 moves out of engagement with the follower on switch 139 allowing the latter to close and thereby sustain power to the pilot valve motor until the shaft 144 has rotated through 180° at which time the lobe 146 on the cam 142 opens the switch 139 and stops the pilot valve motor. As the shaft 144 is rotated through the initial 180°, the lobe 147 on the cam 143 engages the follower on the switch 140 moving the latter out of engagement with contact 140a and into engagement with contact 140b which is the position of the switch 140 when the shaft 144 stops. Rotation of the shaft 144 also causes the pilot valve 12 to be driven, by means of the cam 136 from its normally closed position to an open position. The fluid under pressure in the chamber between the bonnet 73 and the diaphragm 24 in the multiport valve 11 drains through drain conduit 64 whereupon the fluid pressure on the other side of the diaphragm urges the latter upwardly carrying therewith the stem 25, the cam 26 and the distributor 23. As the stem 25 moves upwardly the cam follower 58 which engages the cam grooves 56 on the cam 26 causes the cam and the stem to rotate through 45°. Upon reaching its upper limit of travel, the shoulder 85 on the stem extension 86 engages the follower 84 on the limit switch 83 thereby closing the latter.

As the cam 195 continues counterclockwise rotation it moves out of engagement with the follower of switch 198 whereupon the latter moves out of engagement with contact 198b and into engagement with contact 198a. This applies power through the switch 198 and contact 198a, conductor 204 to switch 199 and contact 199a thereof, conductor 205 to switch 200 and contact 200a thereof, conductor 206 to switch 201 and contact 201a thereof to conductors 207 and 158 to the limit switch 83, and from thence to the conductor 159, contact 140b of switch 140, conductors 152 and 153 to the pilot valve motor 154. When the switch 83 is closed in response to movement of the valve stem to its uppermost position, power is applied to the pilot valve motor 137 thereby energizing the latter and causing the shaft 144 driven thereby to rotate. Cam lobe 146 on cam 142 then moves out of engagement with the follower on switch 139 thereby sustaining motor operation for an additional one-half revolution of the shaft 144 at which time the cam lobe 145 again opens the switch 139. As the shaft 144 is rotated through its second one-half revolution, the cam lobe 147 on cam 143 moves out of engagement with the follower on switch 140 whereby the switch moves out of engagement with contact 140b and into engagement with contact 140a. Simultaneously, the cam 136 operates the pilot valve 12 to its closed position whereupon fluid pressure is admitted from the water inlet line to the chamber between the bonnet 73 and diaphragm 24 on the multiport valve 11, thereby urging the diaphragm downwardly and carrying therewith the stem 25, the cam 26 and the distributor 23. As the multiport valve actuator cam 26 moves downwardly, the cam follower 58 riding in the cam groove 56 causes the cam and the stem 25 to rotate through an additional 45°. The distributor 23 is therefore rotated through 90° in response to opening and closing of the pilot valve 12 into its backwash position whereupon fluid is passed from the hard water inlet passage 72 out through the passage 36 and pipe line 34 to the bottom of the water softener tank 10, fluid from the top of the water softener tank flowing through pile line 32 and passage 30 into the multiport valve 11 and from thence out through drain passage 28 to drain.

As the cam 195 is rotated through one revolution it sequentially engages the followers on switches 199, 200 and 201 to normally move each of these switches out of engagement with contacts 199a, 200a and 201a respectively and into engagement with contacts 199b, 200b and 201b to sequentially energize the pilot valve motor to open the pilot valve and thereafter close the pilot valve when the multiport valve stem has moved to its upper limiting position, whereby the multiport valve is stepped between the various positions to establish the necessary flows to and from the water softening tank 10 during the regeneration cycle thereof. Since the time intervals between stepping of the multiport valve from one rotational position to its next rotational position is dependent upon the time between actuation of the switches 198, 199, 200 and 201 it is apparent that the duration of the respective backwashing, brining and rinsing phases of the regeneration cycle can be controlled by merely adjusting the positions of the switches 198—201 as disclosed in the aforementioned Patent No. 2,742,540, and controlling the speed of rotation of the cam 195 so that the latter completes one revolution in the time necessary to complete the regeneration cycle.

Just before the cam 194 completes one revolution and moves switch 184 out of engagement with contact 184a and into engagement with contact 184b to stop the timer motor 188, the cam 193 engages the follower on the switch 212 moving the contacts 212a and 212b into engagement with contacts 214 and 213 respectively. This applies power from the source through conductors 123, 179, 197, contact 184a of switch 184, conductor 185 and switch 212 to both conductors 215 and 221, which conductors are respectively connected to the latch release coil 216 of the interlock control circuits in units No. 1 and 2. Ground circuit for these latch release coils is completed through the ground circuit of the associated latching coil 162. Thus, latch release coil in unit No. 1 will be energized in response to actuation of switch 212 when the latching relay of that unit is in its latched position, and the latch release coils of the other units will not be energized since the ground circuit therefor are interrupted. Energization of the latch release coil 216 withdraws the latch 219 from engagement with the armature 174 thereby allowing the switches 164, 167, 175 and 176 to move into the unlatched position.

Each time the pilot valve 12 is opened and closed, the distributor 23 in the multiport valve 11 is lifted, turned through 90°, and reseated on the ported valve face 22. In the brining position of the multiport valve, water is applied through the inlet passage 72, passage 38 and pipe line 40, to the injector 42 which withdraws fluid from the brine tank 44 and introduces it into the upper end of the water softening tank 10. Fluid from the lower end of the water softening tank 10 passes through pipe line 34 and passage 36 into the multiport valve and from thence to the drain passage 28.

In the rinse position of the multiport valve, water is admitted from passage 72 and is passed through passage 30 and pipe line 32 to the top of the water softener tank 10. The effluent from the bottom of the tank passes through pipe line 34 through passage 36 in the multiport valve 11 to drain passage 28.

Should the meter switch 101 of unit No. 2 or any other unit which is connected in the battery, close during the regeneration cycle of unit No. 1 regeneration of unit No. 2 is prevented by the interlock controls 17. More specifically, when the latching relay in one of the interlock controls such as that of unit No. 1 is in its latched position, the ground circuit for the latching relays of all of the other units, and likewise the ground circuit for the reset meter motors is disconnected. This prevents actuation of the latching relay of unit No. 2 and thus prevents energization of the pilot valve motor 137 thereof when the timer controlled signals are applied to contacts 150 and 155.

When the meter switch 101 of unit No. 2 drops into the well 105 on the cam 104, to thereby close the switch 101, neither the latching relay in that unit, or the reset meter control will be energized, for the reasons hereinbefore stated. In order to insure that the regeneration cycle of unit No. 2 will be initiated upon the completion of the regeneration cycle in unit No. 1 a friction drive is provided between the cam 104 and the gallonage meter 15. The well 105 is preferably formed in the shape of a V-notch whereby when the similarly shaped follower on the switch 101 drops therein, it locks the cam against further rotation. In this manner, the switch 101 in unit No. 2 is retained closed until such time as the regeneration cycle in that unit is initiated, upon the completion of the regeneration cycle in unit No. 1, and the reset meter motor of unit No. 2 operated to reseat the cam.

Additional water treating units may be readily connected to the control apparatus for automatic control by the timer 14 and in such a manner that regeneration of more than one unit at a time is prevented. The additional unit has a pilot valve control circuit 13, a reset meter control circuit 16 and an interlocking control 17. The pilot valve control circuit and the reset meter control circuit are connected in electrical parallel with the related control circuits of the other units to conductors 150, 158 and 124. The contact 176b and switch 176 of the latching relay are connected in parallel with the corresponding contact and switch of the other relays to conductors 182 and 180 respectively, and switch 164 is connected to conductor 173 in parallel with the corresponding switch of unit No. 2. However, in order to prevent regeneration in more than one unit at one time, the ground circuit for relay No. 1 is connected through conductor 168 to contact 167a of the additional unit, the switch 167 of which is connected to contact 167a of unit No. 2, other connections to the interlocking control being the same. Thus, additional units may be added by connecting the same in parallel except that the ground circuits for the latching relays must be connected in series.

For convenience, the foregoing description was based on the use of a specific multiport valve having a predetermined port arrangement and which is operable in 90° steps between successive positions. Obviously, multiport valves having different port configurations and which may or may not be operable in 90° steps may be used without affecting the operation of the control circuit.

I claim:

1. A control system for a flow control unit including a multiport valve having a ported valve body, a distributor cooperable with said body and movable through an operational cycle in which the distributor is moved between different rotative settings at preselected time intervals to establish various different flows of fluid, fluid pressure responsive valve operating means on the valve for lifting, turning and reseating the distributor on the valve body, pilot valve means for controlling the valve operating means to effect lifting, turning and reseating of the distributor in response to movement of the pilot valve means from a first position to a second position and back, a limit switch actuatable in response to lifting of the distributor to a predetermined position, a motor for operating the pilot valve means between said first and second positions, a timer operable upon energization to complete a timing cycle, a first motor operating circuit means for energizing the motor to operate the pilot valve means from its first position to its second position, timer controlled means for applying power to said first circuit means at selected time intervals during the timing cycle, means in each unit for initiating an operational cycle, means actuated by the cycle initiating means for energizing the timer, and a second motor operating circuit means including said limit switch for energizing said motor to operate the pilot valve means from said second position to said first position when said limit switch is actuated.

2. A control system for a battery of flow control units each including a multiport valve having a ported valve body, a distributor cooperable with said body and movable through an operational cycle in which the distributor is moved between different rotative settings at preselected time intervals to establish various different flows of fluid, fluid pressure responsive valve operating means on each valve for lifting, turning and reseating the distributor on the valve body, pilot valve means individual to each unit for controlling the respective valve operating means to effect lifting, turning and reseating of the distributor in response to movement of the pilot valve means from a first position to a second position and back, a limit switch individual to each unit actuatable in response to lifting of the respective valve distributor to a predetermined position, a motor individual to each unit for operating the respective pilot valve means between said first and second positions, a branch circuit in each unit including a normally open switch means, means in each unit for initiating an operational cycle in that unit independent of the other units, means in each unit actuated by the cycle initiating means of that unit for closing the normally open switch means in the respective branch circuit, a single cycle timer operable upon energization to complete a timing cycle, timer controlled means common to each of said units and connected to the several branch circuits for simultaneously applying power to each of the branch circuits at selected time intervals during the timing cycle, a first motor operating circuit means in each unit connected to the respective branch circuit for energizing the motor in that unit when the respective normally open switch means is closed to operate the respective pilot valve means from its first position to its second position, means responsive to actuation of one switch closing means for disabling the other switch closing means and for energizing the timer, and a second motor operating circuit means in each unit including said limit switch for energizing the motor of that unit to operate the respective pilot valve means from said second position to said first position when said limit switch is actuated.

3. An automatic control system for a flow control apparatus comprising, a lift-turn multiport valve having a ported valve body, a distributor cooperable with said body and movable through an operational cycle in which the distributor is moved between different rotative settings at preselected time intervals to establish various different flows of fluid, fluid pressure responsive valve operating means for lifting, turning and reseating the distributor on the valve body, pilot valve means for controlling said valve operating means to effect lifting, turning and reseating of the distributor in response to movement of the pilot valve means from a first position to a second position and back, switch means actuatable in response to lifting of said valve distributor to a predetermined position, a motor for operating said pilot valve means between first and second positions, a timer, means for initiating the operational cycle, means actuated by said cycle initiating means for operating said timer, means controlled by said timer for energizing said motor to operate said pilot valve from said first position to said second position, means responsive to operation of said pilot valve to said second position for deactuating said timer controlled means, and means controlled by said timer and connected to said switch means and to said motor for energizing said motor to operate said valve from said second position to said first position when said switch means is actuated.

4. A control system for a flow control apparatus comprising, a lift-turn multiport valve having a ported valve body, a distributor cooperable with said body and movable through an operational cycle in which the distributor is moved between different rotative settings at preselected time intervals to establish various different flows of fluid, fluid pressure responsive valve operating means for lifting, turning and reseating the distributor on the valve body, pilot valve means for controlling the valve operating means to effect lifting, turning and reseating of the distributor in response to movement of the pilot valve means from a first position to a second position and back, a motor for operating said pilot valve means between first and second positions, first and second circuit means, means controlled by said motor for connecting said motor to said first circuit means when said valve is in said first position and to said second circuit means when said valve is in said second position, switch means in said second circuit means actuatable in response to lifting of said valve distributor to a predetermined position, means for applying power to said second circuit means, a timer, means for initiating the operational cycle, means actuated by said cycle initiating means for operating said timer, and timer controlled means for perodically interrupting the application of power to said second circuit means and for applying power to said first circuit means when the power to the second circuit means is interrupted whereby said motor first drives said pilot valve from the first position to the second position and then drives the pilot valve from the second position to the first position when said switch means is actuated.

5. The combination of claim 4 wherein said timer controlled means comprises a plurality of normally closed series connected switches for applying power to said second circuit means, a cam element movable through one cycle and adapted to sequentially open and close said series connected switches, and means responsive to opening of any one of said switches for applying power to said first circuit means when the switch is open and to disconnect power from the first circuit means when the switch is closed.

6. A control system for a flow control apparatus including a lift-turn multiport valve, said multiport valve having a ported valve body, a distributor cooperable with said body to control the flow of fluid therethrough and movable through an operational cycle in which the distributor is moved between different rotative settings at preselected time intervals to establish various different flows of fluid, fluid pressure responsive valve operating means for lifting, turning and reseating the distributor on the valve body, pilot valve means for controlling the valve operating means to effect lifting, turning and reseating of the distributor in response to movement of the pilot valve means from a first position to a second position and back, a motor for operating said pilot valve means between first and second positions, first and second circuit means, means controlled by said motor for connecting said motor to said first circuit means when said valve is in said first position and to said second circuit means when said valve is in said second position, switch means in said second circuit means, means for actuating said switch means in response to lifting of said valve distributor to a predetermined position, means for applying power to said second circuit means, a timer, means for initiating the operational cycle, means actuated by said cycle initiating means for operating said timer, timer controlled means for periodically interrupting the application of power to said second circuit means and for applying power to said first circuit means when the power to the second circuit means is interrupted whereby said motor first drives said pilot valve from the first position to the second position and then drives said pilot valve from the second position to the first position when said switch means is actuated, and means controlled by said timer for continuing operation of said timer for the duration of the cycle and for deactuating said timer when the cycle is completed.

7. A control system for a battery of flow control units each including a multiport valve movable to various positions at preselected time intervals to control different flows of fluid during successive phases of an operational cycle, means in each unit for moving the valve between successive positions, electro-responsive means individual to each valve moving means for actuating the latter to effect movement of the respective multiport valve from one position to a succeeding position, means for initiating an operational cycle in each unit independent of the other units, a power circuit common to said units and having branches connected to each of said electro-responsive means, normally open switch means in each of said branches for controlling the application of power to a respective one of said electro-responsive means, means individual to each switch means operable to close the same, means in each unit responsive to said cycle initiating means for operating the switch closing means of that unit to close said switch means and maintain the same closed for the duration of the cycle, means responsive to actuation of the switch closing means in one unit for disabling the switch closing means of the other units, a single cycle timer means adapted upon energization to periodically apply power to said power circuit at time intervals corresponding to the successive phases of the operational cycle and actuate the electro-responsive means connected thereto through said switch means whereby said multiport valve associated with said last mentioned electro-responsive means is periodically moved between successive positions at times determined by said timer means, and means responsive to operation of the switch closing means in any one unit for energizing said timer means.

8. A control system for a battery of flow control units each including a multiport valve movable to various positions at preselected time intervals to control different flows of fluid during successive phases of an operational cycle, means in each unit for moving the valve between successive positions, electro-responsive means individual to each valve moving means for actuating the latter to effect movement of the respective multiport valve from one position to a succeeding position, means for initiating the operational cycle in each unit independent of the other units, a power circuit common to said units and having branches connected to each of said electro-responsive means, normally open switch means in each of said branches for controlling the application of power to a respective one of said electro-responsive means, means individual to each switch means operable to close the same, means in each unit responsive to said cycle initiating means for operating the switch closing means of that unit to close said switch means and maintain the same closed for the duration of the cycle, means responsive to actuation of the switch closing means in one unit for disabling the switch closing means of the other units, a single cycle timer means adapted upon energization to periodically apply power to said power circuit at time intervals corresponding to the successive phases of the operational cycle and actuate the electro-responsive means connected thereto through said switch means whereby said multiport valve associated with said last mentioned electro-responsive means is periodically moved between successive positions at times determined by said timer means, means responsive to operation of the switch closing means in any one unit for energizing said timer means, and means controlled by the timer and responsive to the completion of the cycle for deactuating the switch closing means in said one unit to open the switch means of that unit and enable actuation of the other switch closing means.

9. The combination of claim 8 including means controlled by said timer means and responsive to the completion of the cycle for de-energizing said timer means to stop the latter.

10. A control system for a battery of flow control units each including a multiport valve operable through various positions at preselected time intervals to control different flows of fluid to the unit during the successive phases of an operational cycle, switch means in each unit or initiating the operational cycle in each unit independent of the others, means in each unit for operating said multiport valve to move the same between successive positions, electro-responsive means in each unit for actuating said valve operating means to effect movement of the valve from one position to the next each time the electro-responsive means is energized, a relay in each unit including a plurality of switches operable between first and second positions to engage first and second sets of contacts respectively, an electro-responsive actuator for moving the switches from the first to the second position, means connecting the relay actuators in each unit to the cycle initiating switch means in that unit and through the first set of contacts of the other relays to a source of power whereby one relay actuator may be energized in response to the associated cycle initiating switch means only when all other relay switches are in engagement with the first set of contacts, a single timer for controlling the cycle in all of the flow control units in said battery of units, means responsive to movement of the switches of any one of said relays into engagement with the second set of contacts for starting said timer, and circuit means controlled by the timer and connected through the switches in each of said relays to the electro-responsive means in each of the respective units for periodically energizing each of said electro-responsive means when the switches of the associated relay are in engagement with the second set of contacts.

11. The combination of claim 10 including means responsive to closing of any one of said cycle initiating switch means for maintaining said switch means closed, and means in each unit for opening said switch means operable only when the relay actuator in that unit is energized to move the relay switches to said second position.

References Cited in the file of this patent

UNITED STATES PATENTS

| | | |
|---|---|---|
| Re. 23,076 | Pick | Jan. 11, 1949 |
| 2,042,781 | Grove | June 2, 1936 |
| 2,051,155 | Staegemann | Aug. 18, 1936 |
| 2,235,287 | Daniels | Mar. 18, 1941 |
| 2,240,171 | Brice et al. | Apr. 29, 1941 |
| 2,310,978 | McGill et al. | Feb. 16, 1943 |
| 2,315,223 | Riche | Mar. 30, 1943 |
| 2,631,665 | Perrin | Mar. 17, 1953 |
| 2,679,376 | Steiner | May 25, 1954 |
| 2,699,207 | Russell et al. | Jan. 11, 1955 |
| 2,738,807 | Addison | Mar. 20, 1956 |
| 2,742,540 | Whitlock | Apr. 17, 1956 |